March 21, 1967 H. R. GALLY 3,309,750
APPARATUS AND METHOD FOR MANUFACTURING BRICK
Filed Nov. 9, 1964 5 Sheets-Sheet 1

INVENTOR
HENRY R. GALLY

BY Shoemaker and Mattare
ATTORNEYS

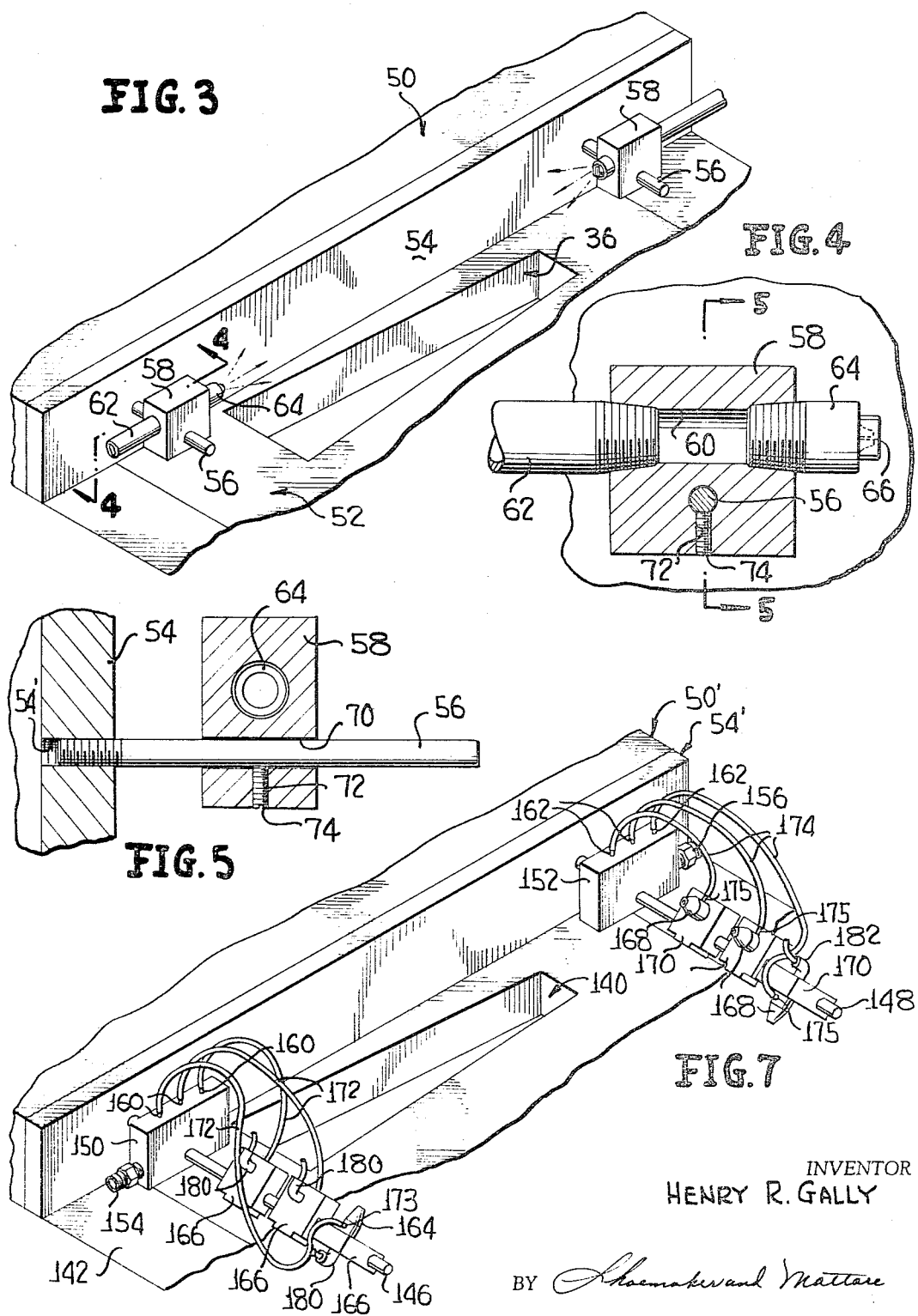

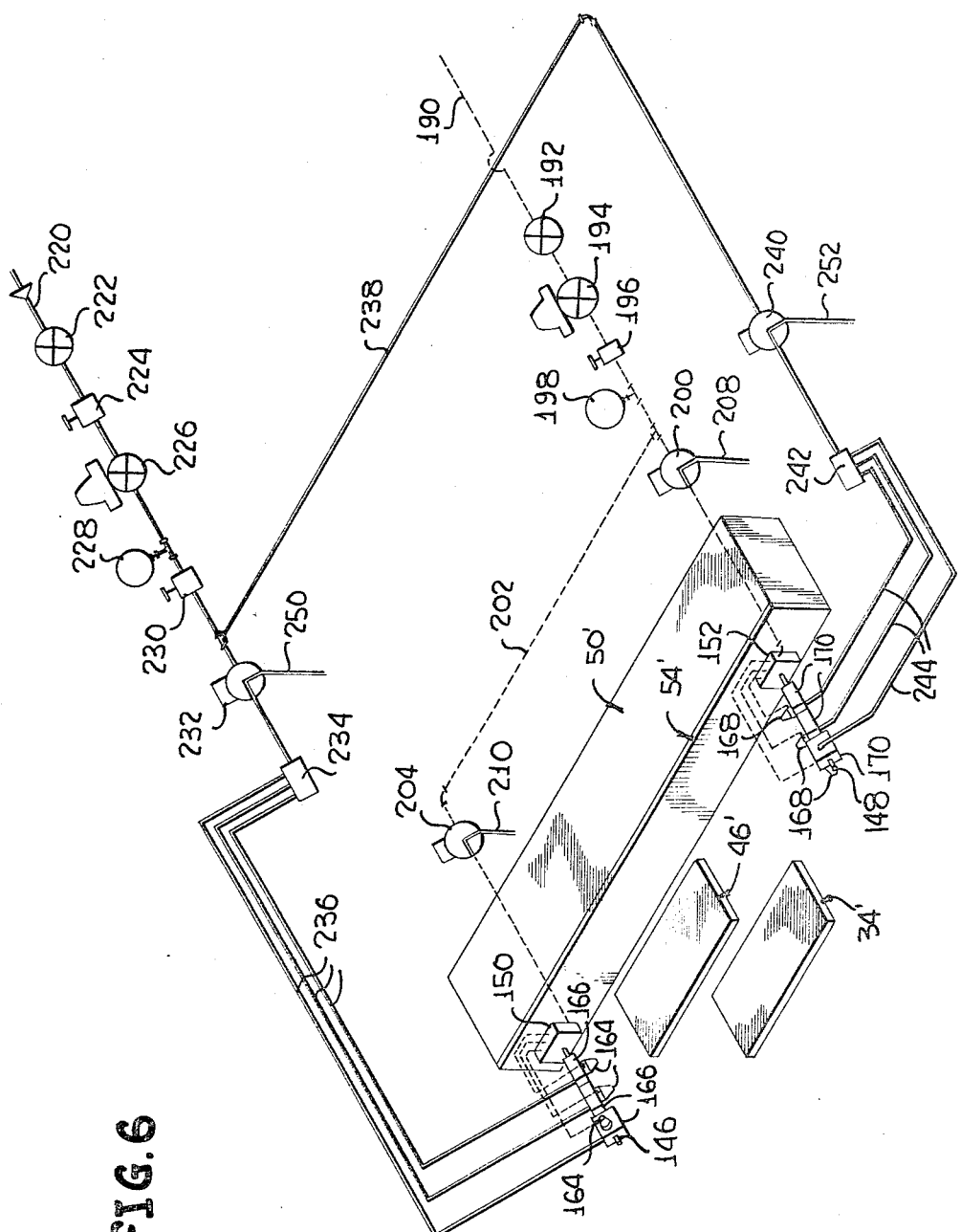

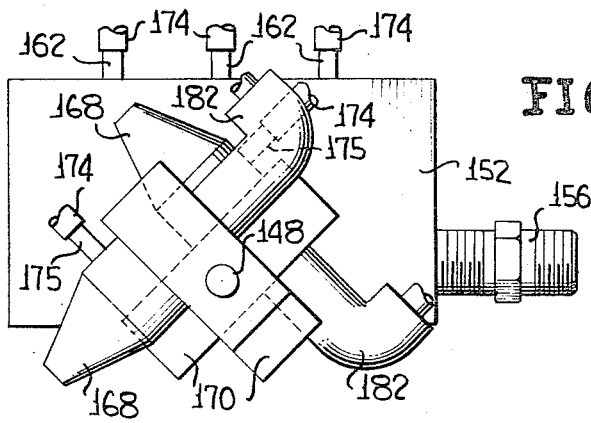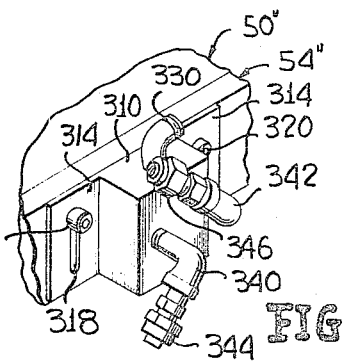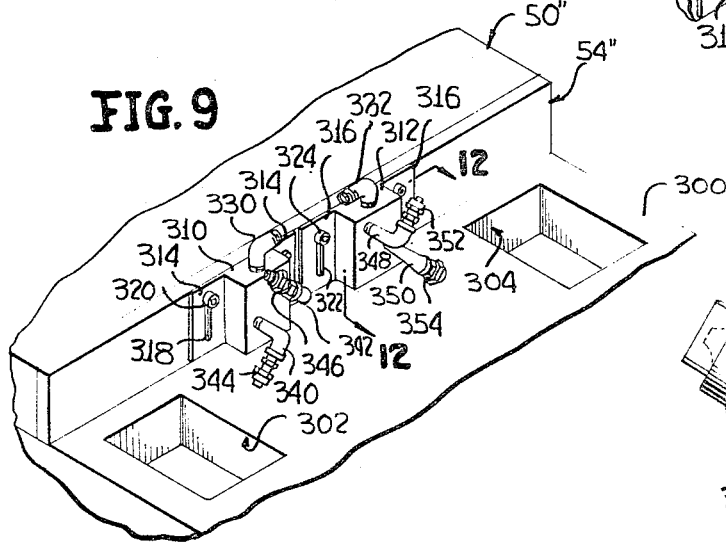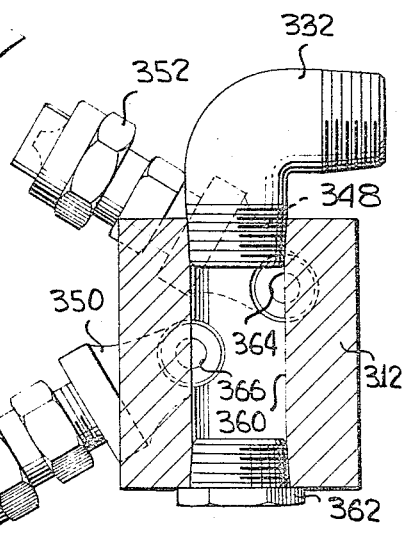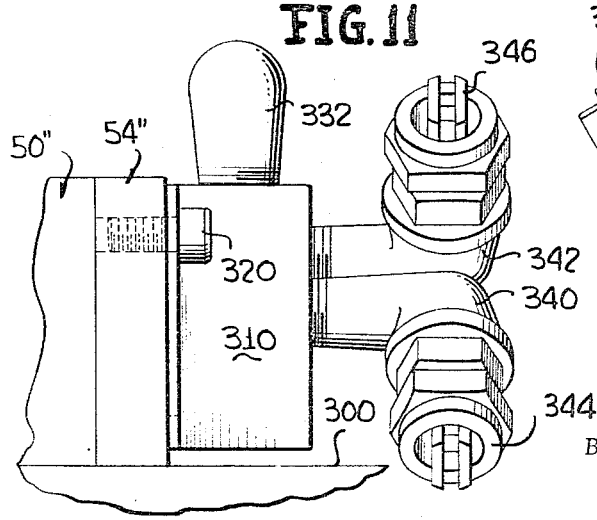

March 21, 1967 H. R. GALLY 3,309,750
APPARATUS AND METHOD FOR MANUFACTURING BRICK
Filed Nov. 9, 1964 5 Sheets-Sheet 5
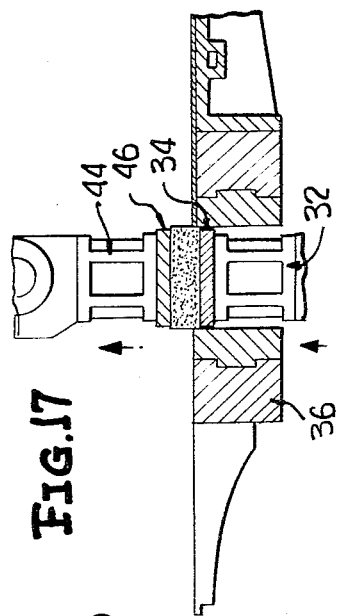
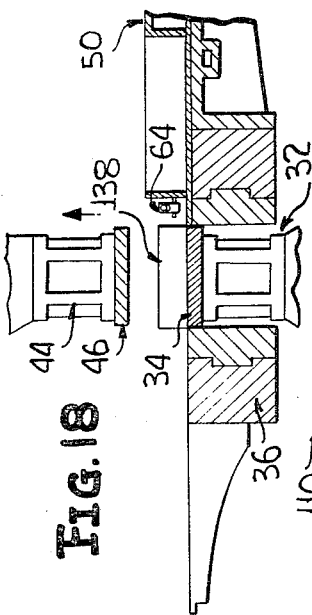
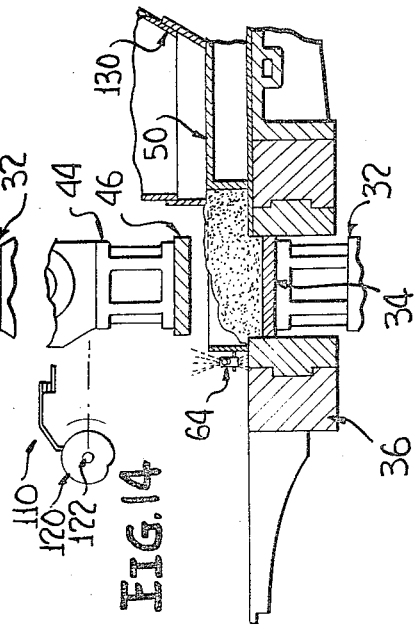
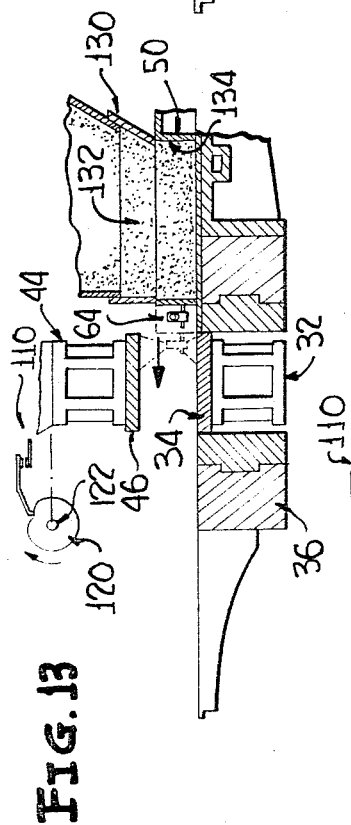
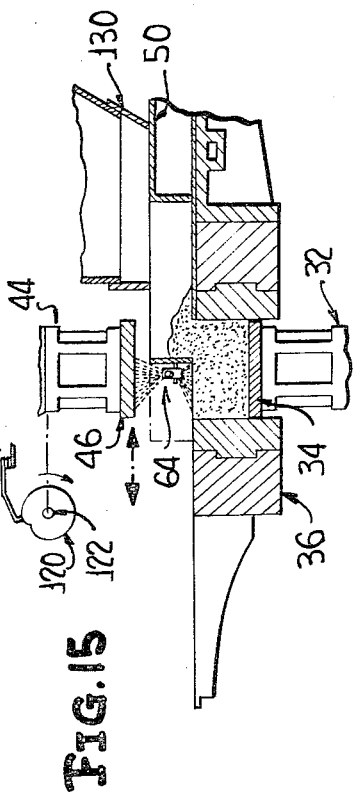
INVENTOR
HENRY R. GALLY
BY *Shoemaker and Mattare*
ATTORNEYS United States Patent Office 3,309,750
Patented Mar. 21, 1967

3,309,750
APPARATUS AND METHOD FOR
MANUFACTURING BRICK
Henry R. Gally, Crown Point, Ind., assignor to E. J. Lavino and Company, Philadelphia, Pa., a corporation of Delaware
Filed Nov. 9, 1964, Ser. No. 409,830
4 Claims. (Cl. 25—45)

The present invention relates to new and novel apparatus and method for manufacturing brick, and more particularly to an arrangement for cleaning and lubricating the die plates employed in the brick forming manufacturing operation so as to substantially increase production.

The present invention is particularly directed to apparatus and method for manufacturing brick wherein a brick press of the type known as the Boyd press is employed, an example of such press being shown in the United States patent to Flood No. 987,124. In this type of press, upper and lower die means are employed between which material is compressed, the material being compressed within a brick mold means so as to form the finished brick.

In this type of manufacturing operation, the material being compressed tends to build up on the upper and lower die means to such an extent that the operation must be periodically suspended in order that the surfaces of the die means can be cleaned so as to remove material therefrom and to present a clean smooth surface for subsequent brick pressing operations. The necessity for so cleaning the die means of course results in down time for the machine, and it is naturally desirable to minimize the amount of time required for such cleaning.

The present invention is accordingly specifically directed to an improvement to be incorporated in a Boyd press and in the method of manufacturing brick so as to minimize the build up of material on the die plates. This means comprises a wetting means in the form of spray nozzles which are adapted to direct a liquid spray on the surfaces of the die means. It has been found that in actual practice a provision of such liquid spray serves to wet, cool and lubricate the die means and substantially reduces the amount of material which tends to build up on the die means. The cooling of the die means is important since a very warm or hot die means tends to allow material to stick thereto quicker than cool die means.

This wetting and cooling means is of such a nature that it can be readily incorporated into conventional brick press structures and can be readily incorporated in methods of manufacture now being employed in the art. The spray nozzles are connected directly with a portion of the charger means employed for feeding material into the brick mold means, the spray means thereby moving between the die means and being for a certain period of operation of the apparatus in a position to readily apply a fine liquid mist to the desired surfaces of the die means.

A further advantage of the provision of the wetting means is the fact that as the spray nozzles travel past the bottom die means, this die means drops away from the spray nozzles and the mist is sprayed into the brick mold cavity and coats the inside of the mold box. This will substantially extend the life of the insert liners resulting in a further improved result in the over all operation.

The wetting means of the present invention contemplates several different modifications, and the spray nozzles may be connected solely with a source of liquid under pressure or a combination of liquid under pressure as well as gas under pressure. In either event, the spray means is adapted to form a fine liquid spray.

Control means is provided for the system in the form of a remotely operated control valve which is actuated in timed relationship to the movement of the charger means so that the spray is effective only when the nozzle means are in a particular relationship with respect to the die means.

Various efforts have been made in the prior art to minimize die plate cleaning. For example, various types of releasing agents and lubricants have been added directly to the material to be compressed between the die means, and this has been found to be unsatisfactory. Additionally, different types of steel and steel finishes such as chrome-hardened die plates and the like have been employed in this type of process. When the die plates are new and highly polished, the cycles between die plate cleanings is increased, but after approximately 4 hours of production, the surface of the die plates begins to rough up and the cycles per cleaning again drop back to the normal 12 to 22 strokes. When utilizing the wetting means of the present invention, the strokes between die plate cleanings have been increased to as many as 1754. With this arrangement, production has been increased from the normal 1750 strokes per shift to approximately 3600 or more strokes per shift. This of course affords a tremendous increase in productivity and accordingly reduces the cost of production.

A particularly important feature of the present invention is the fact that no skilled mechanic is required to install or adjust the apparatus and it can be readily installed in a short period of time by an average workman. The structure is of such a nature that it is quite simple and inexpensive in construction and yet at the same time is very efficient and reliable in operation.

The novel method of the present invention enables the manufacture of brick in a substantially automatic manner requiring little attention on the part of operating personnel thereby increasing production and further enabling the manufacture to be carried out by relatively unskilled workmen.

An object of the present invention is to provide new and novel apparatus for manufacturing brick including means for minimizing the build up of material to be compressed on the die plates of the apparatus and to reduce the cleaning required so as to provide a substantial increase in production.

Another object of the invention is to provide apparatus for manufacturing brick which extends the life of the insert liners employed in the brick mold means of the apparatus.

Yet another object of the invention is to provide apparatus for manufacturing brick which does not require the services of a skilled mechanic in order to install the equipment or adjust the apparatus during operation.

Still a further object of the invention is the provision of apparatus for manufacturing brick which is quite simple and inexpensive in construction and yet which is quite reliable and efficient in operation.

Yet a further object of the invention is to provide a novel method of manufacturing brick which is substantially automatic and which requires less attention in conventional methods, which increases production and which enables the manufacture to be carried out by relatively unskilled personnel.

Other objects and many attendant advantages of the invention will become more apparent when considered in connection with the specification and accompanying drawings, wherein:

FIG. 3 is a top perspective view on an enlarged scale illustrating the manner of mounting the wetting means of the invention;

FIG. 4 is a sectional view taken substantially along line 4—4 of FIG. 3 looking in the direction of the arrows;

FIG. 5 is a sectional view taken substantially along line 5—5 of FIG. 4 looking in the direction of the arrows;

FIG. 6 is a top perspective somewhat schematic view illustrating a second form of the apparatus for carrying out the present invention;

FIG. 7 is a top perspective view on an enlarged scale illustrating the mode of mounting the spray nozzle means of the system shown in FIG. 6;

FIG. 8 is a front elevational view on an enlarged scale of one of the spray nozzle assemblies shown in FIG. 7;

FIG. 9 is a top perspective view of a further modified form of the invention;

FIG. 10 is a top perspective view on an enlarged scale of a portion of the structure shown in FIG. 9;

FIG. 11 is an enlarged side view of the apparatus shown in FIG. 9;

FIG. 12 is an enlarged sectional view taken substantially along line 12—12 of FIG. 9 looking in the direction of the arrows; and FIGS. 13 through 18 inclusive illustrate in a somewhat schematic manner sequential steps in the operation of the apparatus according to the present invention and illustrating the manner of carrying out the method for manufacturing brick according to this invention.

Figure 1:
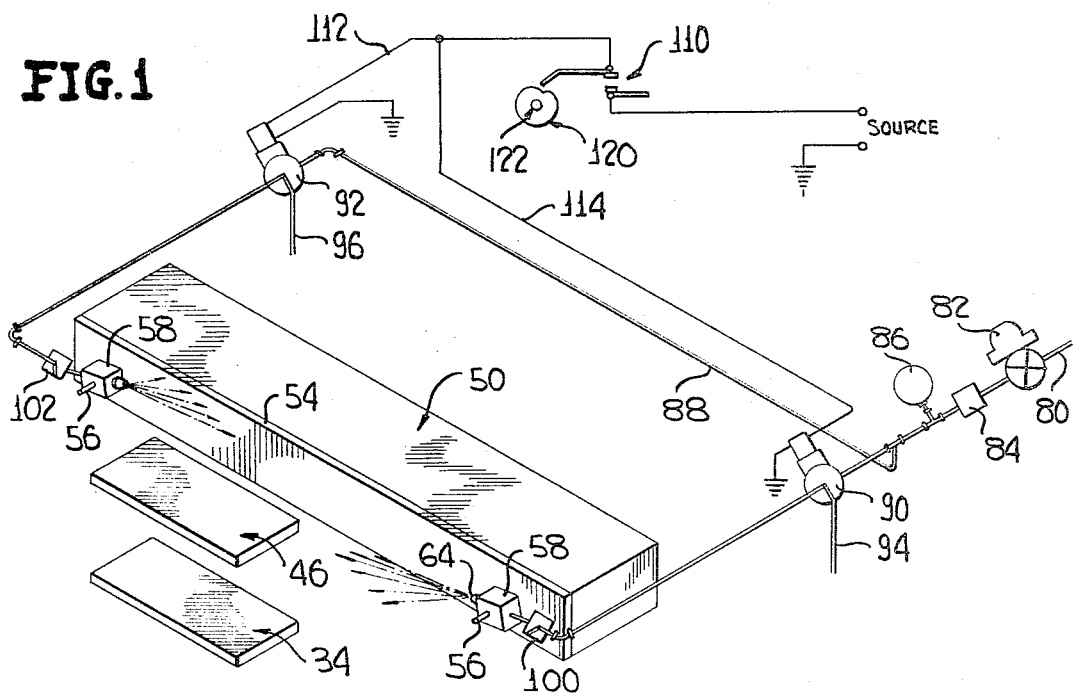
FIG. 1 is a top perspective somewhat schematic view illustrating a first form of the apparatus employed in carrying out the invention.

Referring now to the drawings wherein like reference characters designate corresponding parts throughout the several views, the first form of the invention is illustrated in FIGS. 1 through 5 inclusive, the general features of this machine being shown in U.S. Patents Nos. 418,099 and 987,124 and being well known in the art, and accordingly this structure need not be described in detail.

The brick press includes side bars 20 and 22 which are mounted for vertical sliding movement in side frames 24 and 26. The lower ends of the side bars are interconnected by a lower crosshead (not shown) which is rigidly secured to the side bars and yieldingly supports a saddle means 30 on which is mounted the lower plunger means 32. Plunger means 32 supports a lower die means or die plate 34 which is adapted to reciprocate vertically within a brick mold means indicated generally by reference numeral 36 and including insert liner means 38.

A toggle member 40 is pivotally interconnected with the upper crosshead indicated by reference numeral 42 which in turn supports at the lower surface thereof upper plunger means 44 having the upper die means or die plate 46 rigidly secured to the undersurface thereof, this die plate also being adapted to move into the brick mold means during the compressing operation of the apparatus.

The operating structure for these various components as well as the mode of operation thereof is substantially identical with that discussed in connection with the aforementioned patents, and no further description of this well known structure is considered necessary.

The apparatus includes a charger means indicated generally by reference numeral 52 which is adapted to reciprocate back and forth along a table means indicated by reference numeral 52, the charger means being adapted to feed material to be compressed into the brick mold means in a known manner, and being movable between the upper and lower die means and in overlying relationship to the brick mold cavity.

The charger means includes a front plate means 54 which is suitably attached to the forward portion thereof. This front plate 54 is provided with a pair of threaded opening 54′ one of which is illustrated in FIG. 5, a pair of rods 56 having inner threaded end portions secured in the threaded openings 54′. As seen in FIG. 3, these rods 56 extend forwardly from the charger means and serve as a mount for the wetting means or spray nozzles hereinafter described. Since the construction of each spray assembly at opposite sides of the apparatus is identical, the description of one will suffice.

As seen particularly in FIG. 4, the wetting means includes a block 58 having a passage 60 extending therethrough which is threaded at opposite ends thereof. An inlet fitting 62 is threaded into one end of passage 60 and a nozzle 64 is threaded into the opposite end of passage 60. The nozzle 64 includes a nozzle outlet 66 which is adapted to direct a liquid spray in a suitable direction. As illustrated, this nozzle outlet may be so designed as to direct the liquid spray both in an upward and in a downward direction such that it is adapted to spray liquid both on the upper die means and the lower die means when it moves therebetween. Inlet fitting 62 is connected with a suitable source of liquid under pressure as hereinafter described.

As seen particularly in FIGS. 4 and 5, each of blocks 58 includes a passage 70 extending therethrough which slidably receives the associated rod 56. A passage 72 extends normally to passage 70 and is threaded for receiving a set screw 74 which is threaded therewithin. It is apparent that set screw 74 permits the block 58 to be adjusted in any position along rod 56 longitudinally thereof as well as permitting rotation of block 58 angularly with respect to the associated rod 56. With this arrangement, the positions of the spray nozzles may be adjusted as desired.

Referring now particularly to FIG. 1, the over-all system of this first modification of the invention is illustrated diagrammatically. A conduit 80 is connected with any ordinary plant water supply, a pressure regulator 82 being connected in conduit 80 and being present for example in a range from 60 to 100 p.s.i. A strainer means 84 is connected downstream of regulator valve 82 and may comprise a cast iron line strainer which filters out small foreign objects. A face gauge 86 is connected in conduit 80 downstream of the strainer means 84 to indicate the pressure in the conduit.

The portion of the conduit 80 described to this point may be of metallic construction, and the remaining portion of the conduit means may comprise a suitable polyvinyl plastic or the like. A three-way solenoid valve 90 is connected in conduit 80, and a similar solenoid valve 92 is connected in a branch conduit 88 which extends laterally from conduit 80. The solenoid valves 90 and 92 are each provided with drain conduit means 94 and 96 respectively.

Figure 2:
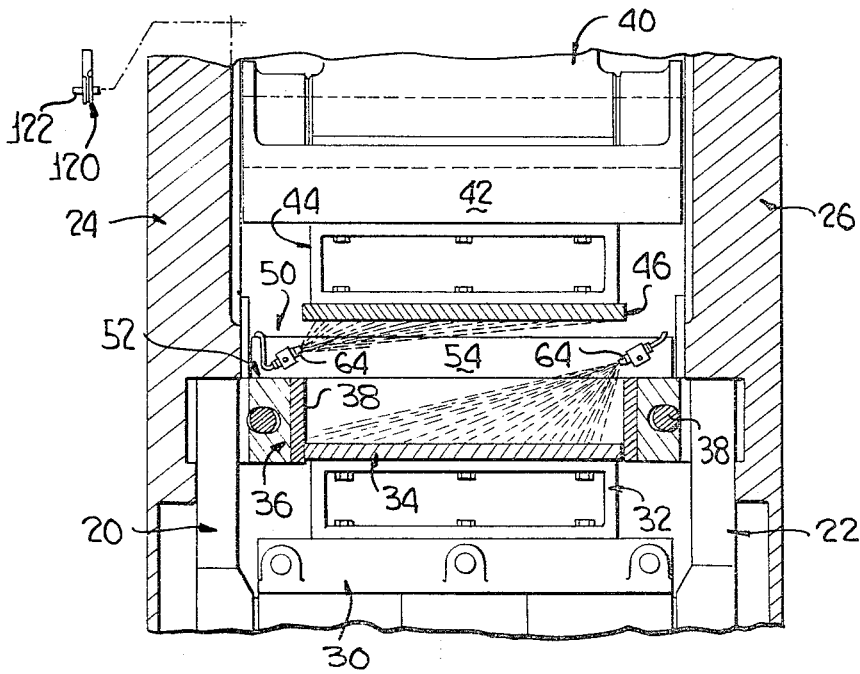
FIG. 2 is a vertical section through a portion of a Boyd brick press incorporating the improvement of the present invention.

Conduit 80 extends from solenoid operated valve 90 to a check valve 100 which in turn is connected with the block 58 within which the nozzle means 64 is mounted. The check valve prevents constant dripping at the nozzle during operation of the apparatus. In a typical example, the nozzle means 64 may deliver approximately .01 gallon per minute at 40 pound pressure. The nozzles may both be adjusted to spray upwardly and downwardly, or the nozzles at opposite sides of the apparatus may be directed in different directions as indicated in FIG. 2 such that one of the nozzles is adapted to spray the undersurface of the upper die means while the other nozzle is adapted to spray the upper surface of the lower die means. A suitable spray angle as well as the size of the nozzle so as to provide the proper amount of spray can be adjusted in accordance with any particular application.

Solenoid valves 90 and 92 are connected with a suitable source of electrical energy through a switch 110 and a pair of electrical leads 112 and 114. The switch 110 is in turn controlled by a timing cam 120 which is fixed for rotation with a portion 122 which may comprise a horizontal axial extension of the main press shaft or crank shaft. This interconnection is similar to that shown in U.S. Patent No. 2,455,823 wherein the rotary cam member of the timing switch is fixed upon a horizontal axial entension of the main press shaft or crank shaft. With the arrangement shown in FIG. 1, the operation of the solenoid operated valves 90 and 92 is coordinated in timed relationship with the movement of the charger means 50 so that the spray nozzles will be actuated during certain periods of the operation of the apparatus.

Referring now to FIGS. 13 through 18 inclusive, the mode of operation of the apparatus according to the present invention and the sequence of steps employed in carrying out the method may be clearly understood. Similar parts have been given similar reference numerals, the illustration in FIGS. 13 through 18 being somewhat schematic and not showing the structural details of the apparatus as discussed in connection with FIGS. 1 through 5 inclusive.

FIG. 13 illustrates an initial stage in the operation of making a brick. As seen in this figure, the control switch 110 is open such that the solenoid valves 90 and 92 provide a liquid connection between the nozzles and the drain lines 94 and 96 respectively. The timing cam 120 is so shaped that a low point on the cam causes the switch to be in an open position at this stage in the operation.

As the timing cam rotates in a clockwise direction from the position shown in FIG. 13 upon further operation of the apparatus, switch 110 will be closed thereby causing the solenoid valves to be actuated such that liquid under pressure is transmitted through the conduit means to the nozzles to initiate the spraying action. The control or timing cam 120 is so designed that the spray is initiated as the charger means begins to move between the upper and lower die means, such as indicated in dotted lines in FIG. 13, and the spray continues until just before the charger means returns to a full back position whereupon the solenoid valves are de-energized and the nozzle means are again connected with the drain lines.

It will accordingly be clear that from the position shown in FIG. 13, the charger means begins to move to the left into the dotted line position whereupon switch 110 is closed and the spray means is activated so as to spray the undersurface of the upper die plate 46 and the upper surface of the lower die plate 34. It will also be noted that a fixed feed hopper 130 is disposed above the charger means so as to provide a body of material indicated by reference numeral 132 which is adapted to be pressed into a finished brick, this material flowing downwardly through the open bottom of the feed hopper and into a suitable cavity 134 provided in the charger means.

Turning now to FIG. 14, it will be noted that the charger means has moved to the left to discharge material downwardly within the brick mold means 36 and the lower die plate 34 has lowered downwardly into the brick mold means. It should be noted that as the charger means initially moves to the left as seen in these figures, and when the spray nozzle means is disposed in overlying relationship to the brick mold means, the bottom die plate drops down and the liquid mist is sprayed in the mold cavity and coats the inside of the mold box to thereby extend the life of the insert liners as discussed previously.

As seen in FIG. 14, the control cam 120 has rotated clockwise through an angle of approximately 180 degrees from that shown in FIG. 13 and the switch 110 remains in its closed position such that the spray nozzles are still activated.

Referring now to FIG. 15, the lower die plate 34 has moved downwardly to enable the material to be received within the brick mold means, and the charger means 50 has started to move back to the right as seen in this figure so as to scrape off any excess material above the horizontal level of the table over which the charger means moves. The spray nozzle is still activated at this stage of the operation of the apparatus, and it will be noted that cam 120 still maintains switch 110 closed.

Referring now to FIG. 16, the charger means has moved to its full back position, the charger means being eliminated from this view for the sake of clarity and the spray nozzle means has been de-activated due to the fact that the switch 110 is opened since it is now riding on a low point on the cam 120. The upper die plate has moved downwardly to compress the material within the brick mold means and to form the brick.

Turning now to FIG. 17, both the upper die means 46 and the lower die means 34 have moved upwardly with the compressed brick therebetween. Here again, the charger means and the feed hopper have been eliminated for the sake of illustration.

Referring now to FIG. 18, the lower die plate 34 has reached the level of the table and has come to rest at such point with the finished brick illustrated here by reference numeral 138 supported thereon. The upper die plate has continued to move upwardly so as to provide a clearance with the upper surface of the pressed brick, and of course in this position the spray nozzle means remains de-activated and the switch 110 is open due to the fact that a portion of the switch is riding on the low point of the cam 120. At this stage of the operation, the pressed brick 138 is removed in a suitable manner, and it is contemplated that this brick will be removed either by suitable brick picker mechanism or it can be slid off of the lower die plate means manually. It is also possible that the charger means itself may move the brick off of the lower die plate as the charger means moves to the left as it continues its cycle of operation.

It will be understood that after the apparatus has successively gone through the stages illustrated in FIGS. 13 through 18, the apparatus will again commence the same cycle, and this cycle will be continuously repeated so as to produce the pressed bricks in a mass production operation.

Referring now to FIGS. 6 through 8 inclusive, a modified form of the invention is illustrated wherein the system is generally similar to that previously described except that the spray in this case is created by the provision of both liquid and gas under pressure which is supplied to the nozzle means of the apparatus. The lower and upper die means 34' and 46' as well as the charger means 50' and the front plate means 54' correspond to the similarly numbered parts in FIG. 1, the numbers in FIG. 6 having been primed. As seen in FIG. 7, the brick mold means is indicated by reference numeral 140, this brick mold means being recessed within the table portion 142 over which the charger means moves.

In this modification, a pair of rods 146 and 148 are suitably secured to the front plate means 54' as by being threaded into a suitable hole as in the previous modification, and a pair of small brass manifolds 150 and 152 are mounted on these rods, the manifolds having suitable bores formed therethrough for receiving such rods and being held in place on the rods by means of a set screw or the like. The manifolds 150 and 152 are provided with liquid inlet fittings 154 and 156 respectively. The inlets 154 and 156 are each in communication with a bore extending lengthwise through the associated manifold, this last-mentioned bore of each manifold being connected with small copper pipes extending outwardly from the manifolds. These pipes are indicated by reference numerals 160 on manifold 150 and 162 on manifold 152, there being three such pipes on each manifold.

A first plurality of nozzles 164 are mounted within brass holders 166 which in turn are provided with bores for receiving rod 146, the holders being held in place as by a set screw or the like to permit the desired positioning of the associated nozzles. A similar group of nozzles 168 are mounted within holders 170 which are in turn adjustably mounted in a like manner on rod 148.

Three flexible hoses 172 are interconnected with pipes 160 at one end thereof and are also interconnected at the opposite end thereof with similar pipes 173 which are soldered into the nozzles 164. Three flexible hoses 174 are interconnected at one end thereof with the pipes 162, the opposite ends of hoses 174 being interconnected with pipes 175 which are soldered into the nozzles 168. The interconnection of the flexible hoses 172 and 174 provides liquid communication between the manifolds 150 and 152 and the nozzles 164 and 168 respectively.

Standard elbow compressed air connections 180 are connected with blocks 166 and similiar connections 182 are connected with blocks 170. These elbow connections are adapted to provide a source of gas under pressure to the nozzles and are interconnected with suitable passage means provided in the blocks to provide communication with the interior of the nozzles.

Referring now particularly to FIG. 6, conduit means 190 is connected with a suitable source of liquid such as water under pressure. A shut off valve 192 is provided in conduit means 190, and a pressure regulating valve adapted to reduce the pressure down to about 5 pounds is indicated at 194 just downstream of the shut off valve. A water strainer 196 is provided downstream of the pressure regulating valve, and a pressure gauge 198 is in turn connected downstream of strainer 196.

The conduit means 190 downstream of pressure gauge 198 may comprise flexible plastic tubing and has a remotely controlled three-way solenoid valve 200 connected therein, the conduit means in turn being connected with the manifold 152.

A branch conduit 202 has a valve 204 similar to valve 200 connected therein, the branch conduit in turn being connected with the manifold 150.

It should be understood that the remotely operated solenoid valves 200 and 204 correspond to the valves 90 and 92 respectively which were previously described in connection with the modification shown in FIG. 1, valves 200 and 204 of the modification shown in FIG. 6 being operated by a control cam or timing cam in the identical manner discussed in connection with FIG. 1 such that the spray nozzle means of the modification shown in FIG. 6 is operated in the same time sequential relationship with the movement of the charger means as previously discussed. Drain outlet conduit means 208 and 210 are connected with valves 200 and 204 for draining the liquid from the nozzle means when the nozzle means is disconnected from the source of liquid under pressure.

A conduit 220 is connected with a suitable source of gas under pressure such as compressed air, and a shut off valve 222 is connected in this conduit. A compressed air strainer 224 is connected downstream of shut off valve 222, and a pressure regulating valve 226 is connected downstream of the strainer, the pressure regulating valve being adapted to maintain the compressed air at a pressure of approximately 55 pounds. A pressure gauge 228 is in turn connected downstream of the pressure, regulating valve, and a fitting 230 for providing lubricating oil is connected in the line downstream of the pressure gauge.

A remotely controlled three-way solenoid valve 232 is connected in conduit 220 and is adapted to control the flow of gas under pressure to a manifold 234 which in turn is connected by means of flexible plastic tubes 236 or the like with the elbow compressed air connections 180 previously discussed.

A branch conduit 238 has a remotely controlled valve 240 connected therein, this valve being of similar construction to valve 232 and controlling the flow of gas under pressure to a manifold 242 which in turn is connected by means of flexible tubes 244 with the elbow compressed air connections 182 previously described.

Valves 232 and 240 are also connected with exhaust conduits 250 and 252 respectively for exhausting the gas under pressure to atmosphere when the nozzle means are de-activated and are disconnected from the source of compressed air.

The solenoid operated valves 232 and 240 are also adapted to be remotely controlled by operation of the timing cam previously mentioned such that the operation of valves 232 and 240 is substantially simultaneous with the operation of valves 200 and 204 whereby the liquid under pressure and the gas under pressure are both fed to the nozzle means at the same time so as to provide the desired nozzle spray.

As seen in FIGS. 6 and 7, two of the nozzles at the left side of the apparatus as viewed are directed downwardly while one nozzle is directed upwardly. At the other side of the apparatus, two of the nozzles are directed upwardly while one nozzle is directed downwardly. It is apparent that the position of the nozzles may be adjusted as desired so as to thoroughly and uniformly spray the surfaces of the die means to obtain the desired results.

It will be noted that the operation and sequence of steps involved in the apparatus and method as shown in FIGS. 6 through 8 inclusive is substatially the same as discussed in connection with the previous modification, and the only major distinction is the fact that the spray means includes both a source of liquid and gas under pressure in contrast to the first described system which relies solely upon a source of liquid under pressure to provide the spray.

Referring now particularly to FIGS. 9 through 12 inclusive, a still further modified form of the invention is illustrated. In this modification, the charger means 50″ as well as the front plate means 54″ correspond to the members 50 and 54 previously described. The charger means and its associated front plate means are movable over a table portion 300 having a pair of brick mold means 302 and 304 formed therein. It will be apparent that insofar as the general concepts of the invention are involved, any number or shape of brick mold cavities can be provided.

A pair of manifolds 310 and 312 are incorporated in this form of the invention, manifold 310 including integral oppositely extending attaching flanges 314, while manifold 312 includes integral oppositely extending attaching flanges 316.

Flanges 314 each have vertical slots 318 formed therein which are adapted to receive screws 320 which extend through such slots and are screwed into suitable threaded openings provided in the front plate means 54″. This permits the position of the manifold to be vertically adjusted with respect to the front plate means. Flanges 316 are similarly provided with elongated vertical slots 322 which receive screw members 324 adapted to be screwed into suitable holes provided in the front plate means.

An elbow fitting 330 is interconnected with manifold 310 and a similar elbow fitting 330 is interconnected with manifold 312, these elbow fittings being adapted to be connected with a source of liquid under pressure in the same manner as defined in connection with the system shown in FIG. 1.

A pair of elbow fittings 340 and 342 are threaded into the front face of manifold 310 and are adapted to support spray nozzle means 344 and 346 respectively. It will be understood that the interior of the manifold is provided with suitable means for providing communication between the inlet fitting 330 and the spray nozzle means as will be hereinafter more fully explained.

A pair of elbow fittings 348 and 350 are threaded into the front face of manifold 312, fittings 348 and 350 being adapted to support spray nozzles 352 and 354 respectively.

Referring now to FIG. 12, the manner in which the manifolds provides communication between the inlet fittings and the spray nozzle means will become more apparent. As seen in this figure, the inlet fitting 332 is threaded into one threaded end portion of a vertically extending central passage 360 provided through the manifold 312. It will be understood that the construction in connection with manifold 310 is identical with that as shown in FIG. 12. A plug member 362 is threaded into the opposite threaded end portion of passage 360. The elbow fittings 348 and 350 are provided with passages 364 and 366 respectively which are in communication with the central passage 360 so that the liquid entering the manifold 312 through the inlet fitting will pass equally and uniformly out through the pair of spray nozzles 352 and 354.

By forming the manifold means in the manner illustrated, greater versatility is afforded to the apparatus since the same manifold means can be utilized at either side of the apparatus and it may be turned upside down in doing so whereby the inlet fitting and the plug may be reversed so as to enable the arrangement to be mounted at the opposite side of the press.

In the modifications shown in FIGS. 1 and 6, the spray nozzles are illustrated as being mounted at opposite sides of a particular die plate so as to spray the die plate from opposite directions. The same results may be obtained in an arrangement as shown in FIG. 9 wherein the spray nozzle means is mounted only at one side of a particular die plate means. It is clear that the arrangement of the nozzle means can be varied in accordance with any particular application with the spray nozzle means mounted either at one or both sides of a particular die plate means and one or a plurality of spray nozzles being employed as required. The angle of the nozzles may also be adjusted and is a function of the distance between the die plates and the horizontal position of the manifolds with respect to the die plates.

In the foregoing discussion, the liquid employed will generally be water, although other liquids may also be suitable for this purpose. In addition, a suitable detergent may be added to the liquid in order to afford a better cleaning action of the die plates.

When operating a press on a single stroke cycle, it may be desirable to wet and cool the top die plate means of the apparatus by spraying liquid thereon.

It is apparent from the foregoing that there is provided according to the present invention new and novel apparatus for manufacturing brick including means for wetting or spraying the surfaces of the die means to cool such surfaces and minimize the build up of material thereon to cut down on the cleaning required of the die plates and accordingly provide a substantial increase in production. The apparatus of the present invention also serves to extend the lift of the insert liners in the brick mold means since these liners are also sprayed during operation of the apparatus. No skilled mechanics are required to install or adjust the apparatus and the structure is quite simple and inexpensive and yet at the same time is very reliable and efficient in operation. The novel method of manufacturing brick according to the present invention is substantially automatic and requires less attention than present methods. The new method increases production and enables the manufacture to be carried out by relatively unskilled personnel.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. Apparatus for manufacturing brick comprising upper die means, lower die means, brick mold means for receiving said die means, charger means mounted for movement between said upper die means and said lower die means and in overlying relationship to said brick mold means, said charger means including front plate means, wetting means supported on said front plate means and extending outwardly therefrom and movable therewith, said wetting means including nozzle means adapted to create a liquid spray, said nozzle means including a first nozzle portion directed upwardly to direct liquid spray onto the undersurface of said upper die means, said nozzle means including a second nozzle portion directed downwardly to direct liquid spray onto the interior surfaces of said brick mold means and onto the upper surface of said lower die means upon movement of said charger means between said die means, and means connected with said wetting means for controlling the operation thereof in predetermined timed relationship to the movement of said charger means between said die means.

2. Apparatus as defined in claim 1 wherein said nozzle means is adjustably mounted with respect to said front plate means, and means for fixing the nozzle means in adjusted position.

3. Apparatus as defined in claim 1 including a source of liquid under pressure operatively connected with said nozzle means, said control means including a valve connected between said source and said nozzle means for controlling the flow of liquid under pressure to said nozzle means.

4. Apparatus as defined in claim 1 including manifold means operatively connected with each of said nozzle portions, a source of liquid under pressure, said manifold means being operatively connected with said source, said manifold means including a central passage formed therethrough, said nozzles being supported by said manifold means and being in communication with said central passage therethrough, and means closing off one end of said central passage.

References Cited by the Examiner

UNITED STATES PATENTS

| | | | |
|---|---|---|---|
| 512,251 | 1/1894 | Jordon. | |
| 535,835 | 3/1895 | Lewis. | |
| 665,163 | 1/1901 | Bass et al. | |
| 687,688 | 11/1901 | Klay. | |
| 692,605 | 2/1902 | Bratton. | |
| 2,259,524 | 10/1941 | Kistler | 264—338 |
| 2,410,422 | 11/1946 | Breen et al. | |
| 2,529,291 | 11/1950 | Graham. | |
| 2,534,767 | 12/1950 | Greiner et al. | 15—302 |
| 2,622,278 | 12/1952 | Eckler | 264—338 |
| 2,639,213 | 5/1953 | Barth. | |
| 2,836,873 | 6/1958 | Lingl | 25—45 |
| 3,010,176 | 11/1961 | Blackburn et al. | 25—22 |
| 3,011,213 | 12/1961 | Brandon et al. | |
| 3,029,752 | 4/1962 | Frank. | |
| 3,044,139 | 7/1962 | Morton et al. | 25—45 |
| 3,068,526 | 12/1962 | Croan. | |
| 3,192,579 | 6/1965 | Lubalin. | |

WILLIAM J. STEPHENSON, *Primary Examiner.*

J. SPENCER OVERHOLSER, *Examiner.*